(12) United States Patent
Martin

(10) Patent No.: US 7,372,819 B2
(45) Date of Patent: May 13, 2008

(54) ADAPTIVE PACKET ROUTING

(75) Inventor: Andrew Louis Martin, Ferney Creek (AU)

(73) Assignee: Lucent Technologies Inc., Murray Hill, NJ (US)

( * ) Notice: Subject to any disclaimer, the term of this patent is extended or adjusted under 35 U.S.C. 154(b) by 879 days.

(21) Appl. No.: 10/479,897

(22) PCT Filed: Jun. 11, 2002

(86) PCT No.: PCT/AU02/00749

§ 371 (c)(1),
(2), (4) Date: Dec. 3, 2003

(87) PCT Pub. No.: WO02/103961

PCT Pub. Date: Dec. 27, 2002

(65) Prior Publication Data

US 2004/0146056 A1    Jul. 29, 2004

(30) Foreign Application Priority Data

Jun. 20, 2001 (AU) .................................. PR5803

(51) Int. Cl.
*H04L 12/56* (2006.01)
(52) U.S. Cl. ................. 370/252; 370/389; 370/395.62; 370/401
(58) Field of Classification Search ................. 370/503, 370/507, 508, 522, 252, 316, 389, 395.31, 370/395.6, 395.61, 395.62, 400, 401
See application file for complete search history.

(56) References Cited

U.S. PATENT DOCUMENTS

| | | | | |
|---|---|---|---|---|
| 5,402,424 A | | 3/1995 | Kou | |
| 5,430,729 A | * | 7/1995 | Rahnema | 370/409 |
| 5,596,722 A | * | 1/1997 | Rahnema | 709/241 |
| 5,842,146 A | * | 11/1998 | Shishido | 701/210 |
| 5,854,793 A | * | 12/1998 | Dinkins | 370/503 |
| 5,944,840 A | * | 8/1999 | Lever | 714/34 |
| 6,084,864 A | * | 7/2000 | Liron | 370/316 |
| 6,115,422 A | * | 9/2000 | Anderson et al. | 375/240 |
| 6,347,084 B1 | * | 2/2002 | Hulyalkar et al. | 370/347 |
| 6,449,478 B1 | * | 9/2002 | Valentine et al. | 455/430 |
| 6,760,328 B1 | * | 7/2004 | Ofek | 370/389 |
| 2002/0018475 A1 | * | 2/2002 | Ofek et al. | 370/400 |

FOREIGN PATENT DOCUMENTS

| WO | WO 98/13969 | 4/1998 |
|---|---|---|
| WO | WO 99/65198 | 12/1999 |

* cited by examiner

*Primary Examiner*—Min Jung

(57) ABSTRACT

A method of determining the latency of a route in a packet-switched network, a packet switch for use in such a method and network and a packet-switched network are disclosed. Preferably, each switch maintains a routing table that records the latency of the routes accessible by that switch. Each switch also preferably has a GPS-based universal time clock which it employs to time the transmission and arrival of identifiable timing packets, these times being used to compute route latency and to up-date the routing tables. In one example (FIG. 1) a packet-switched network has a plurality of switches (S1-S6) interconnected by links or trunks (T1-T7). A local GPS-base clock (GPS CLK) is connected to each switch (S1-S6) to enable the accurate timing of transmission and reception of identifiable timing packets in accordance with a system-wide universal timing standard.

20 Claims, 6 Drawing Sheets

Fig. 5

PORTION OF THE LOOK-UP TABLE GENERATED AT SWITCH S3

| SOURCE | MEASURED LATENCY | ROLLING AVERAGE LATENCY | ASSIGNED CLASS |
|---|---|---|---|
| T1-C1 | | | |
| T1-C2 | | | |
| T1-C3 | | | |
| T1-C4 | | | |
| | | | |
| T2-C1 | | | |
| T2-C2 | | | |
| T2-C3 | | | |
| T2-C4 | | | |
| | | | |
| T3-C1 | | | |
| T3-C2 | | | |
| T3-C3 | | | |
| T3-C4 | | | |
| | | | |
| T6-C1 | | | |
| T6-C2 | | | |
| T6-C3 | | | |
| T6-C4 | | | |
| | | | |
| T7-C1 | | | |
| T7-C2 | | | |
| T7-C3 | | | |
| T7-C4 | | | |

ADAPTIVE PACKET ROUTING

TECHNICAL FIELD

This invention relates to means for or associated with adaptive routing of packets, cells, data, messages or sessions in telecommunications and/or computer networks covering large geographical areas. It also relates to network management systems for such networks employing adaptive routing.

The term 'adaptive routing' indicates that the route taken by packets across the network takes account of varying conditions within the network, such as delays, faults, congestion, etc. The invention is suited for use in packet-switched networks that use hop-by-hop/packet-by-packet routing protocols (for example IP or Internet Protocol) with store-and-forward techniques, as well as in networks where the complete route is negotiated at the start of a session and maintained throughout the session (for example ATM or Asynchronous Transfer Mode protocols).

The invention is also concerned with means for determining link and/or router latencies in a network and for using such determinations to up-date and maintain latency and/or routing tables in the network.

BACKGROUND TO THE INVENTION

Common and long-established methods for assessing the quality of a link in an IP network involve the use of ICMP [Internet Control Message Protocol] to send echo-reply control messages between network entities to check if a remote device is accessible and the delays involved. This method commonly made use of a program, PING [Packet Internet Groper], to check accessibility and transmission delays. The resultant data was then used to maintain routing tables for dynamic hop-by-hop routing using SNMP [Simple Network Management Protocol] over TCP/IP [Transmission Control Protocol/Internet Protocol].

Though still in widespread use, 'pinging' has a number of serious drawbacks as a means for determining link and router latencies (packet transit and processing delays). First, the receipt and processing of the ping and the generation of the echo-reply by the recipient requires a variable amount of processing time, dependant upon the instantaneous processing load of the recipient. Second, the receipt and processing of the echo and the computation of the transit time requires a variable amount of processing time at the sender, which also depends upon the instantaneous processing load of the sender and adds to the apparent latency of the network elements involved. Third, a ping that involves multiple hops via multiple routers using a hop-by-hop protocol may not be indicative of the following message or session transmission speed since—in a TCP/IP system—many of the packets comprising the message might take different routes to their destination as a result of dynamic routing. Moreover, the interrogation and echo packets of a ping may themselves take different routes in a hop-by-hop routing system. Fourth, pinging using hop-by-hop protocols will poorly represent the latency of an end-to-end connection established under the ATM protocol since the route negotiated for the ATM message is likely to be different to that taken by the ping. Fifth, pining is highly wasteful of network resources because:

(i) each network element must be pinged from each other element to establish and maintain a comprehensive set of routing tables, (ii) though a control packet carrying a ping or echo may transit many intermediate nodes or routers, those intermediate devices cannot garner latency information from that packet, and (iii) each ping involves two transits across the network, one interrogation and one echo.

It is known for each router to maintain a router table or database that records at least some qualitative property of each link connected to a router to inform routing decisions; that is, to allow the most appropriate intermediate node or router to be selected for the forwarding of a packet or for establishing an end-to-end ATM connection. In many networks, the network manager maintains a master router table or database that records all such information for the network. Since the capacity and transmission delay (latency) of a route will vary according to traffic load and the capabilities of the links and routers in that route, router tables need constant updating. This is especially important for the connection-oriented ATM protocol where transmission quality 'contracts' are negotiable. The use of constantly updated routing tables at each router for the purpose of dynamically determining routing in a network is often called 'adaptive routing'.

While latency is one of the most important quality parameters of a link, it is not the only one and it is known to record other fixed and variable characteristics of a link in a router table. For example, International patent application PCT/SE98/02345 [WO 99/33232] by Ericsson discloses an algorithm for computing a quality parameter called 'link cost', recording that parameter in router tables and using it for establishing connections in an ATM system. The inputs for this computation are themselves computed variables such as maximum cell transfer delay, peak-to-peak cell delay variation, available cell rate, cell loss ratio, and the like. While link latency is a vital input for such computations, the Ericsson application is silent with regard to how link latency is determined.

U.S. Pat. No. 4,771,424 to Hitachi discloses an adaptive routing system in which the queue length at a router on a link is used as a proxy for the latency of that link and router tables are maintained using that data. However, there are two important problems with this: first, the latency of the link itself is ignored so that a slow link that terminates at a fast receiver with no packet queue is seen to have zero latency and, second, interrogation/management packets must wait their turn in the queue for processing and return with the requested data.

U.S. Pat. No. 5,805,602 to Bell Atlantic Network Services, Inc discloses a method of minimising packet jitter when decoding a stream of ATM cells carrying audio or MPEG-encoded data into an IP packet stream, which method uses both the internal program clock reference [PCR] carried by the audio or MPEG data and an external clock at the receiver. However, this patent is not concerned with adaptive routing and there is no suggestion that packet jitter might be used as a proxy for link quality, or that either the variation between the PCR time and 'absolute' time (eg, UTS time) might be used in that way. However, this Bell Atlantic patent rightly emphasises that special care is needed when transmitting video or audio packets and, by implication, highlights the need for accurate and up-to-date data on composite route latency in a network when routes are being negotiated for such packets. Nevertheless, the Bell Atlantic patent is silent as to how either link or router latency is measured.

In a large and complex network—such as the global Internet—there may be many intermediate switches and links/trunks in a virtual circuit and the choice of route can be an important factor in end-to-end communications speed, even where all relevant switches and links are operating normally. Routing algorithms are known and widely used but tend to be computationally intensive and are generally unable to take account of rapidly varying local traffic conditions, or to handle data according to priority or bandwidth requirements. They also involve considerable cost in terms of management overheads if link latency is measured by pinging or by a proxy such as packet queue length at router ports. The alternative expedient of setting aside trunk and switch capacity to handle streaming video/audio data, or other high-priority data, is inefficient and costly in terms of the utilization of network capacity.

OUTLINE OF INVENTION

From one aspect the present invention comprises a method of determining the latency of a route between two switches in a packet-switched telecommunications network. In this method, an identified timing packet is transmitted from a first switch to a second switch in the network via a predetermined route and the universal time of transmittal of the packet at the first switch is determined by the use of a first clock at or near the first switch, which clock receives timing signals from a system of earth satellites. [For convenience, such packets may be hereafter referred to as 'timing packets' or 'identified packets' as well as 'identified timing packets, and such clocks may be referred to as 'GPS clocks'.] The time of transmittal of the first packet is recorded at the first switch and the universal time of its receipt is recorded at the second switch is recorded using a GPS clock at or near that switch. The times of transmission and receipt of the identified packet are then used to determine the latency of the route and to update routing table(s) at the switches and/or at a network controller or monitor.

The time of transmittal can be recorded in the timing packet itself, read by the receiving switch(es) and the latency of the route then computed by the receiving switch(es). Alternatively, the transmitting switch and the receiving switch(es) can interrogate one another to find out the respective receipt and transmission times of the identified packet so that each can then compute the latency of the route and update its own routing table. Alternatively, a master switch or controller could under take the interrogation, make the computation and then inform each of the relevant switches of the latency of the route and/or various sections of it.

A convenient way of recording the time of transmittal and receipt of an identified packet is for the transmitting switch to set a flag in the packet as it is being transmitted (or, less preferably, immediately before transmission) and to record the time at which the flag is set as proxy for the time of transmission. Similarly, the receiving switch detects and resets the flag in the identified packet and records the time of resetting as proxy for the receipt time. For this to be effective, it is desirable for the flag to be in the packet header in a low-level protocol.

From another aspect, the invention comprises a switch suitable for use in a packet-switched telecommunications network, the switch having an associated GPS clock and means to record the universal time of transmission and/or reception of identified timing packets via multiple routes to and from other switches in the network. The switch may also have means for storing a routing table and means for referencing that table when deciding the route on which to send normal packet traffic. The switch may then have means for calculating the latency of routes by reference, inter alia, to the recorded universal times of transmission and receipt of identified packets.

From another aspect the invention may comprise a digital packet-switching telecommunications network including a plurality of switches (including exchanges, routers, servers and the like) connected to one another by one or more telecommunications links/trunks in which at least one switch automatically maintains a routing table listing the speed or latency of links, other switches and/or routes comprising combinations of links and switches, the routing table being used by the switch (or by a network manager or ATM sender) as an input when determining the routing of packets or messages; the network being characterised in that:

each switch includes or is associated with a GPS-based clock, and the transit times, as measured by the use of the GPS clocks, of packets received or despatched by the switch are employed to up-date the routing table at the switch.

A preferred method of determining packet transit times and updating routing tables makes use of a GPS-based event recorder of the type disclosed in our Australian patent 716041. However, any event recorder may be used that is able to access a standard accurate time that is universal or common across the network and satellite-based clocks that do not have the features disclosed in our prior patent can be used in the present invention. Most usually, the universal or common time will be UTS time and the most common way of accessing that time will be via time signals distributed globally by satellite systems such as the GPS set of satellites.

It is preferred, for the purposes of this invention, to make use of the fact that packets associated with network management (as well as many other packets) tend to include unique identifying numbers as well as address codes indicative of the sender and the intended recipient (whether it be the initiating sender and the ultimate destination or hop-by-hop intermediate senders and receivers). These packets may include low-level headers that indicate the types of packet (eg, a timing packet). Provision may be made for a timer flag (a single bit will usually be all that is needed) to be included in or near the packet header so that it can be readily recognised and changed.

The coding of a packet as a timer packet with the identifying transmitter and receiver addresses, together with the insertion of any desired administrative commands or information into the timer packet, can be done by the sending switch in advance of transmission, but the timer flag should remain unset. The timer packet can then be queued for transmission on a selected network route in the normal manner. Only when the timing packet is actually being placed on the route, is the timer flag set and that event recorded as proxy for the time of transmission.

It is preferable for the timer flag or the packet type identification to be made at or near the network-protocol level so that the minimum of processing is needed before the packet can identified as a timer packet and its identification number ('ID') can be read. Of course, the timer packet may include the intended destination address, the sender's address, a datagram inserted by the sender for interpretation by the addressee using common protocols such as TCP/UDP/IP. For example, the addressed switch may be requested to return data for recent timer packets sent, or it may be provided with data for updating its router table.

Immediately upon receiving a packet, recognising it as a timer packet and determining its ID, receiving switch can reset the timer flag and that event is used as proxy for packet reception so that the event recorder at the receiving switch can accurately identify the time of receipt. The time of receipt, along with the packet ID and any other data required (such as the identity of the sending switch) can then be recorded in a data log maintained by the event recorder. Even if the timer packet does not include a timer flag, the type of packet can be quickly identified and the time of packet receipt can be determined with minimum of processing at the receiving switch. After recording the time of receipt of the packet, the packet can be added to the queue for processing by the switch. If it is to be forwarded to another switch, a new header (containing the new address along with the packet ID and a timer flag) can be applied and the packet placed in the queue for transmission. Again, the event recorder can record the time of transmission and packet ID at substantially the same time as the packet is being placed on the network. In this way, router latency can be accurately and separately measured independently of link latency.

Of course, if the received timer packet is intended for the receiving switch (as determined by the destination address), it will need to be further processed at higher protocol levels at that switch so as to determine whether there is a message or instruction that is intended for an application process running at the receiving switch. The destination switch will not normally be required to forward that timer packet to another switch. Perhaps the most important an immediate function of the timer packet will have been performed by causing the time of its receipt along with its identity to have been recorded as an event in the even recorder of the destination switch.

When the sender/originator of the timer packet in the above scenario needs to up-date its routing table with the latency data associated with the timer packet or packets that it has transmitted, it can send a normal network management packet requesting the receipt times for one or more identified timer packets at one or more of the switches enroute to one or more destinations (including the destination switch or switches, if desired) to which it has sent timer packets. Upon receipt of the interrogation packet, each relevant reporting switch reads the recorded time(s) of receipt and/or transmission for each identified timer packet and transmits that data, along with the reporting switch's identity, to the sender/requester. The sender/requester can then automatically compute the latency for the respective link and/or switch by subtracting the recorded time of transmittal of the timer packet from the reported time of receipt, and then use that information to update its router table information.

While this method of updating router tables can be employed by each or any switch in the network, an alternative method is also envisaged whereby the overheads associated with timer packets can be reduced. An intermediate switch that receives and forwards a timer packet can use its event recorder to record not only the time of receipt and the packet ID, but also the identity of the originator, the identity of the ultimate destination and, possibly, the identity of the upstream switch from which the packet was received. This allows the intermediate switch to send query packets to the other identified switches to request information about the time that the timer packet was sent and received, permitting the intermediate switch to update its router table without itself having to send a timer packet. Alternatively, even greater overhead reductions can be achieved where a master switch (the network manager) is the only one to send timer packets and to request returns. In that case, the master switch can then send the latency information gathered to other switches in the network, which then update their router tables accordingly.

Another method of determining packet transit times in accordance with the present invention is for the sending switch to use its GPS clock to time-stamp selected outgoing packets with the time of despatch and for the receiving switch to determine the time of receipt of the packet using its GPS clock and to then compute and record in its routing table the latency of the relevant link or links and/or the latency of communication with the sending switch. This has the advantage that it need only involve a single short packet sent one-way, but it has the disadvantage that, in most implementations, the transit time recorded will include variable amounts of packet processing time at the sender and receiver switches. As in the first described method, the time-stamped network management packets need only be sent during periods of light traffic so that the routing tables of switches can be updated without impinging upon traffic throughput.

Since each switch in a network can keep its own latency records in this way, simple routing algorithms can be employed to ensure the fastest available transmission when a virtual circuit is established or being negotiated. Thus congested or slow links can be automatically avoided. Alternatively, where a circuit of pre-designated priority is being negotiated, a link with the most appropriate latency can be automatically selected by a sending switch by simply referring to its look-up table. In this way, a high-priority session that is intended to carry live packets or other high-speed data can be assigned to the link with the lowest latency; conversely, a low priority session intended for normal email or file transfer can be assigned to the slowest links, leaving the faster links available for higher priority data.

It will be appreciated that a route between two subscribers cannot be established solely by local selection of the fastest link at each switch. Attention must also be paid to the packet's/session's ultimate destination. Accordingly, overall route selection will normally be under the general control of network routers. If desired, the router can interrogate each switch that may be relevant for the circuit to determine the latency of its associated links. Link selection can be made by the router routine rather than at the switch level.

From another aspect, the present invention involves methods for implementing the above-indicated routing procedures. One method comprises the step of building tables of link latency at each of a plurality of switches within a telecommunications network by reading time-stamped packets sent by other connected switches, computing the lapsed time between the time stamp and the time of receipt to determine the latency of the relevant link, recording that link's latency in the relevant table, and looking up the table when a message is to be transmitted to determine the appropriate link for use in the transmission. The method may include the step of matching recorded link latency with the relative priority of the message or session in order to assign the appropriate link for transmission. The method may include the step, at each switch, of deriving a GPS-referenced clock signal for the purpose of time-stamping outgoing timer packets, and for the purpose of determining the time of receipt of an incoming timer packet.

It should be noted that the term 'latency' as used herein is an indication of the speed of a link, or a series of links and switches. Latency can be graded according to slowness or speed. It should also be noted that the use of the initials 'GPS clock' is intended to encompass or refer to any timekeeper that is periodically calibrated, reset or otherwise automatically adjusted by the use of satellite-derived signals. It is not intended to refer uniquely or exclusively to the set of US satellites that are commonly called the 'global positioning system' or the 'global positioning satellites'.

DESCRIPTION OF EXAMPLES

Having broadly portrayed the nature of the present invention, examples of the implementation of the invention will now be indicated by way of illustration only. The examples will be described with reference to the accompanying drawings in which:

FIG. 5 is an example of a look-up table that is automatically built and maintained at each switch of the network for the purpose of intelligent routing.

FIG. 1, illustrates a small portion of a large packet-switching telecommunications network comprising a group of digital switches S1-S6 in connected together via trunks or links, some of which are identified as T1 to T7.

Figure 1:
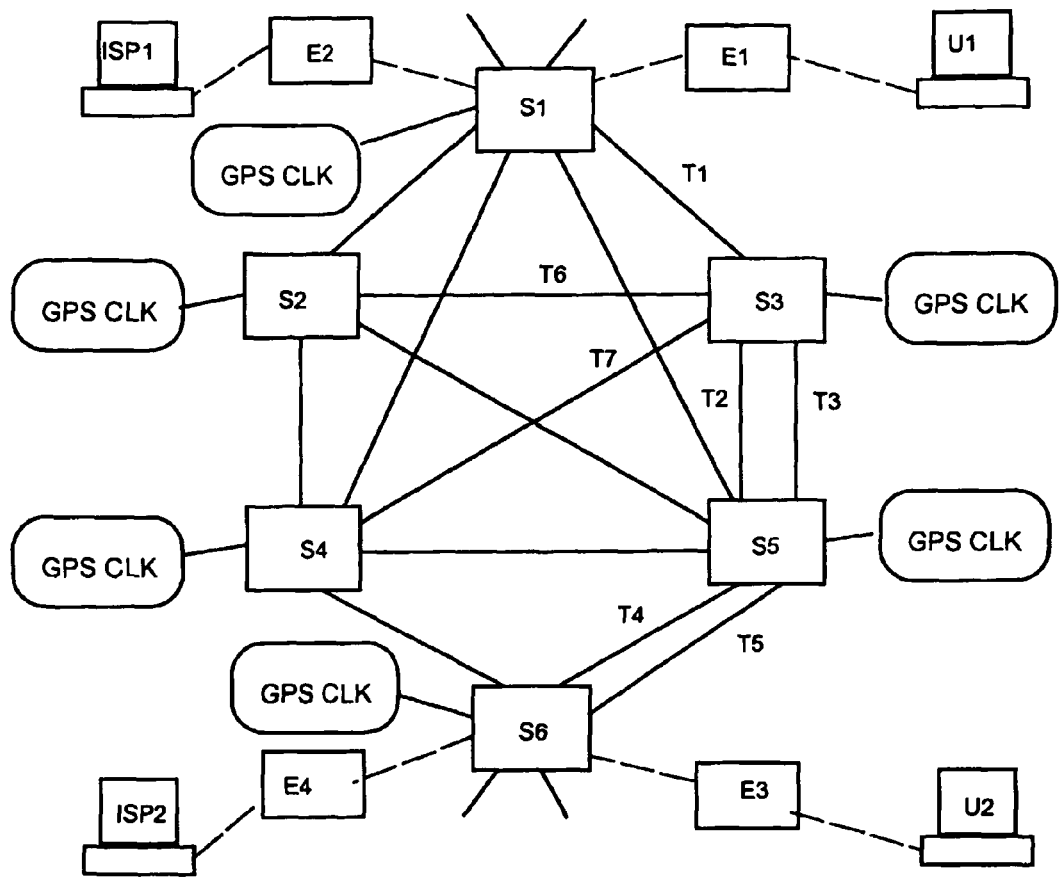
FIG. 1 is a diagram of a group of interconnected switches that forms part of a telecommunications network of the first example.

Each trunk or link itself is normally divided into many separate communications channels and many separate messages or sessions are normally carried by each channel using known multiplexing techniques. The trunks or links normally extend over substantial distances (tens or hundreds of kilometres) and may employ a variety of transmission media—microwave beams, optical fibres and/or wire (whether coaxial or twisted pairs). They will normally include a number of intermediate relay or amplifier stations to amplify and reconstitute attenuated or distorted signals.

It will be appreciated that a physical connection, such as an optical fibre or a train of microwave stations, may carry a plurality of 'virtual' trunks and that a channel may be encoded to serve as a plurality of virtual sub-channels. The terms indicate stages in the complexity of multiplexing. It is sufficient for the present purposes to note that every switch is connected to a neighbouring switch by a large number of parallel channels so that there is a wide choice between channels for any particular session. Also, where heavy traffic is expected between any two switches, the switches will be interconnected by a large number of parallel channels that will normally be grouped into a plurality of physical or virtual trunks. This is diagrammatically illustrated with switches S3 and S5 which are directly interconnected by parallel trunks T1 and T2 and switches S5 and S6 which are connected by another pair of parallel trunks T3 and T4. The through-put speed (inverse of latency) of each trunk and channel can vary considerably depending upon the state of the physical media and the performance of the relay stations.

For convenience of description, it will be assumed that each trunk has only four multiplexed channels (identified as C1-C4). This configuration of trunks and channels is illustrated diagrammatically for switch S3 in FIG. 2. Thus, when establishing a route for a session (ie, when setting up a virtual circuit), a particular channel of a particular trunk must be selected. Normally, the selection of parallel trunk T2 or T3 and of the particular channel (C1 to C4) will be left to a predetermined routine built into the transmission equipment that operates without regard to varying latency, session priority or data type. This 'blind' or 'dumb' trunk and channel allocation is replaced by the 'intelligent' routing method of the present invention.

It will be apparent, however, that the matter of overall route selection is more complex than the selection of an appropriate one of a number of alternative parallel channels between switches. A large number of alternative indirect connections are available. For example, switch S3 could be connected to switch S5 indirectly via S2 or S4, less indirectly via S2 and S4, even less directly via S1, S2 and S4, etc. Nevertheless, the methods of the present invention will be useful in assisting the overall routing function as they can be applied between any pair of switches in the network (not merely adjacent switches).

Figure 2:
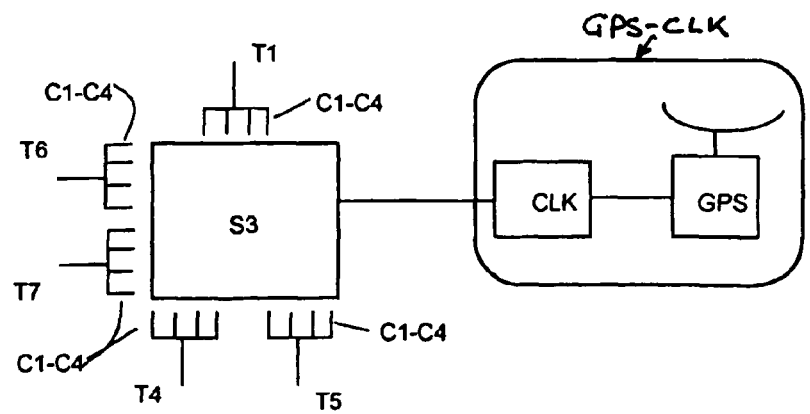
FIG. 2 is a diagram showing one of the switches of the network of FIG. 1, together with its connecting links, in more detail.

In the chosen example, a local GPS-referenced clock GPS CLK is connected to each switch so as to ensure that all switches in the network are provided with a common time-reference signal having a precision of the order of microseconds and, preferably, of the order of nanoseconds. In FIG. 2 the letters 'GPS' identify the GPS receiver modules while the letters 'CLK' identify the associated clock circuits. The GPS and clock circuits may be formed as disclosed in our above-mentioned international patent application.

When one user at terminal U1 connects to its local ISP1 via local exchanges E1 and E2 to establish a session with a second user at remote terminal U2 via the second user's local ISP2 and its local exchanges E3 and E4, ISP1 sends the request to the nearest switch S1 and the session is set up so that S1 is connected to S6 (the switch closest to ISP2). The general route employed between S1 and S6 maybe determined by existing routers using (i) regional maps (tables) that indicate the most direct (or otherwise most preferable) route between S1 and S2, (ii) current information about intermediate switches or links that are out of service and, if desired, (iii) data on trunk channel speeds provided by the system of the present invention. Otherwise, channel and parallel trunk selection can be left for automatic allocation at the switch level on the basis of a fixed 'try-sequence' based upon an overall network map, the priority level allocated to the session and the switch look-up tables that are maintained (in accordance with the present invention) at each switch on the attempted route.

Of course, before the main session is established with U2, user U1 can 'ping' ISP1 and check the two-way speed of the last kilometre and local switch S1. Indeed, user U1 can ping user U2 in a preliminary test session to check the likely speed of connection to U2. However, the route that is later established for the main session may not be the same as that established for the 'ping session' and the results are likely to be deceptive. It is, of course, impractical for a router to effectively ping all possible routes between two users in order to establish that which provides the desired speed or priority. The administrative burden on the system would be grossly excessive and connection times would often be unacceptably long.

Figure 3:
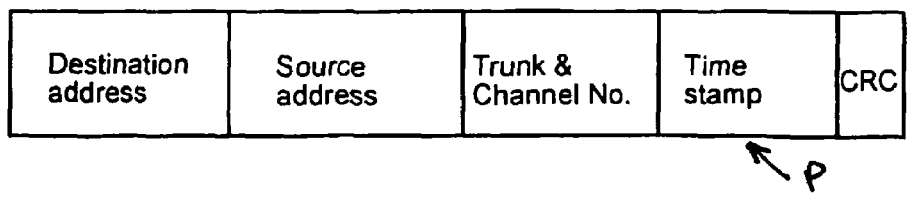
FIG. 3 is a diagram illustrating the structure of a timer packet employed in the first example.
Figure 4:
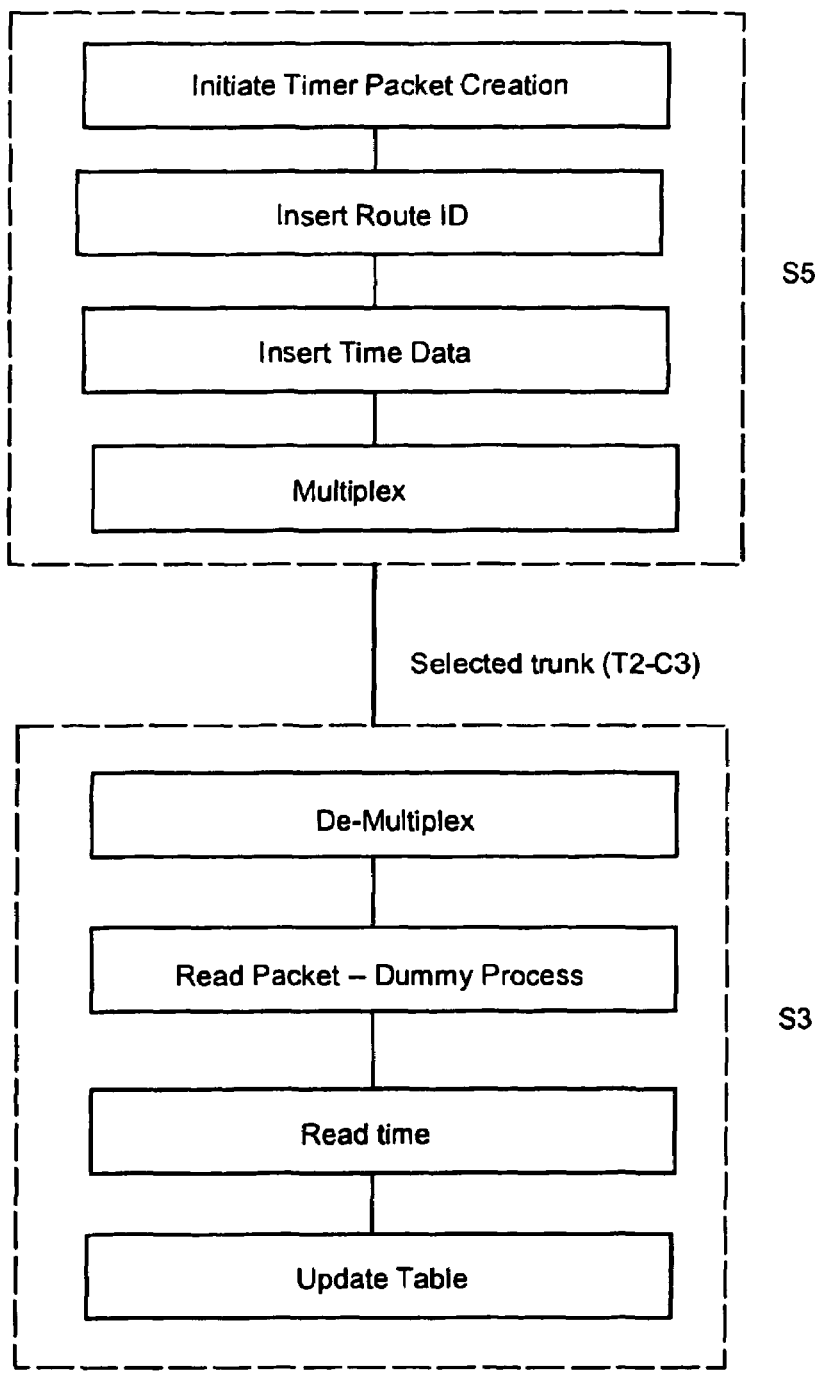
FIG. 4 is a flow diagram illustrating the procedure by which a timer packet is generated and accepted by interconnected switches of the first example.

In accordance with the chosen example, each switch automatically generates and sends occasional timing packets to each neighbouring switch (and, optionally, to other indirectly-connected switches). The frequency of such packets can vary as desired with the nominal speed of the relevant link, packets being sent at intervals of the order of tenths of seconds to minutes as desired. A typical timing packet P is illustrated diagrammatically in FIG. 3, while the procedure by which such packets are generated and handled between switches S3 and S5 is indicated by FIG. 4. FIG. 5 shows the form of the look-up table generated and maintained at switch S3 relating to trunks T1, T2, T3, T6 and T7.

In general, conformity with the Internet protocol, the timer packet generated by S5 for transmission to S3 includes the address of the destination switch (S3 in this case) in its header, followed by the source address (of S5), and then followed by a data segment comprising (i) the trunk and channel being tested (say, T2-C3) and (ii) the time-stamp or tag applied by the sender (S5). Finally, the packet concludes with a cyclic redundancy check code CRC and an appropriate packet end code (not indicated in FIG. 3). The procedure for generating packet P at S5 and for processing the received packet at S3 is generally indicated by the flow chart of FIG. 4.

At the appropriate interval, the creation of a timer packet P is initiated within S5 so as to incorporate (i) the address of destination C3, (ii) the identity of the trunk and channel to be employed and (iii) the precise time at which the packet is created as read from the GPS clock. The packet is then multiplexed onto the appropriate trunk and channel (T2-C3) and transmitted to S3. The channels of T2 are demultiplexed at S3 and the address destination and type of each packet is determined. Immediately packet P is recognised as a timer packet addressed to S3, S3 reads its clock GPS CLK and computes the time difference between transmission and receipt, so determining the latency of T2-C3. The resultant data is recorded in a look-up table of the type indicated in FIG. 5 at switch S3. The data in the look-up table is then used at a later time to determine the most appropriate trunk and channel to employ for a session having a given class of priority.

It will be appreciated, however, that switch S6 could also generate a timer packet addressed to S3 via a particular channel in trunk T4 or T5 and another in trunk T2 or T3, and that the table at T3 could be extended to record the overall latency of such a multiple 'hop' (the identity of both channels employed being included in the timer packet). In theory, each switch could maintain a record of the latency of all channels and all combinations of channels in a network in this manner and the routing of a session would be determined by reference to the table held in the first switch to be encountered. For example, switch S1 is the first switch for outgoing messages from ISP1 and U1.

As an alternative, a high-level router could be used to determine the most direct possible route in the conventional manner and then interrogate all switches on that route to determine if a channel of the requisite speed is available for each link. If so, the session can be set up accordingly. If not, all switches on the next most direct route are interrogated.

Figure 6:
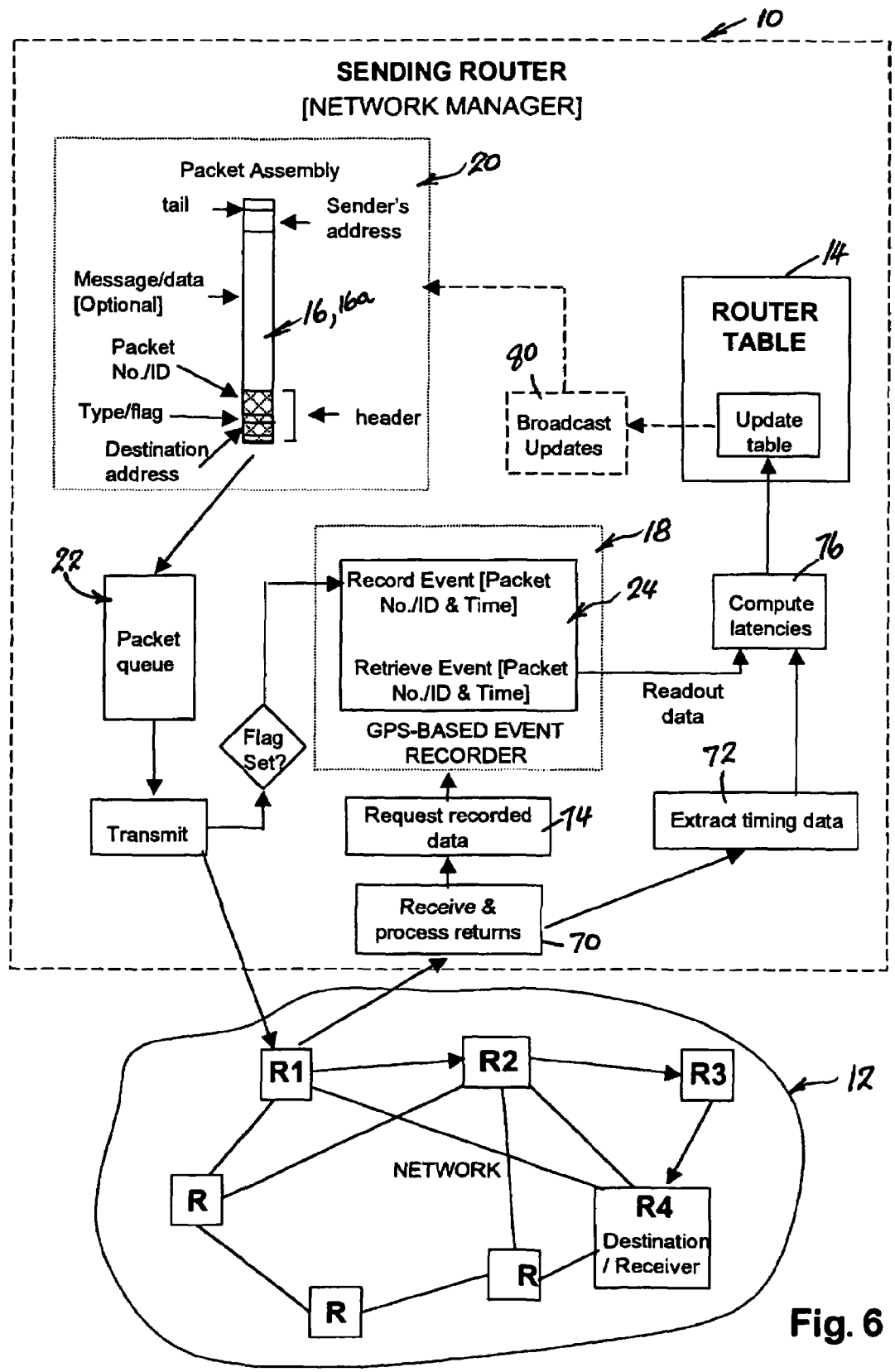
FIG. 6 is a schematic diagram of a switch of the second example that sends a timer packet, receives a reporting packet and updates its latency or router table.
Figure 7:
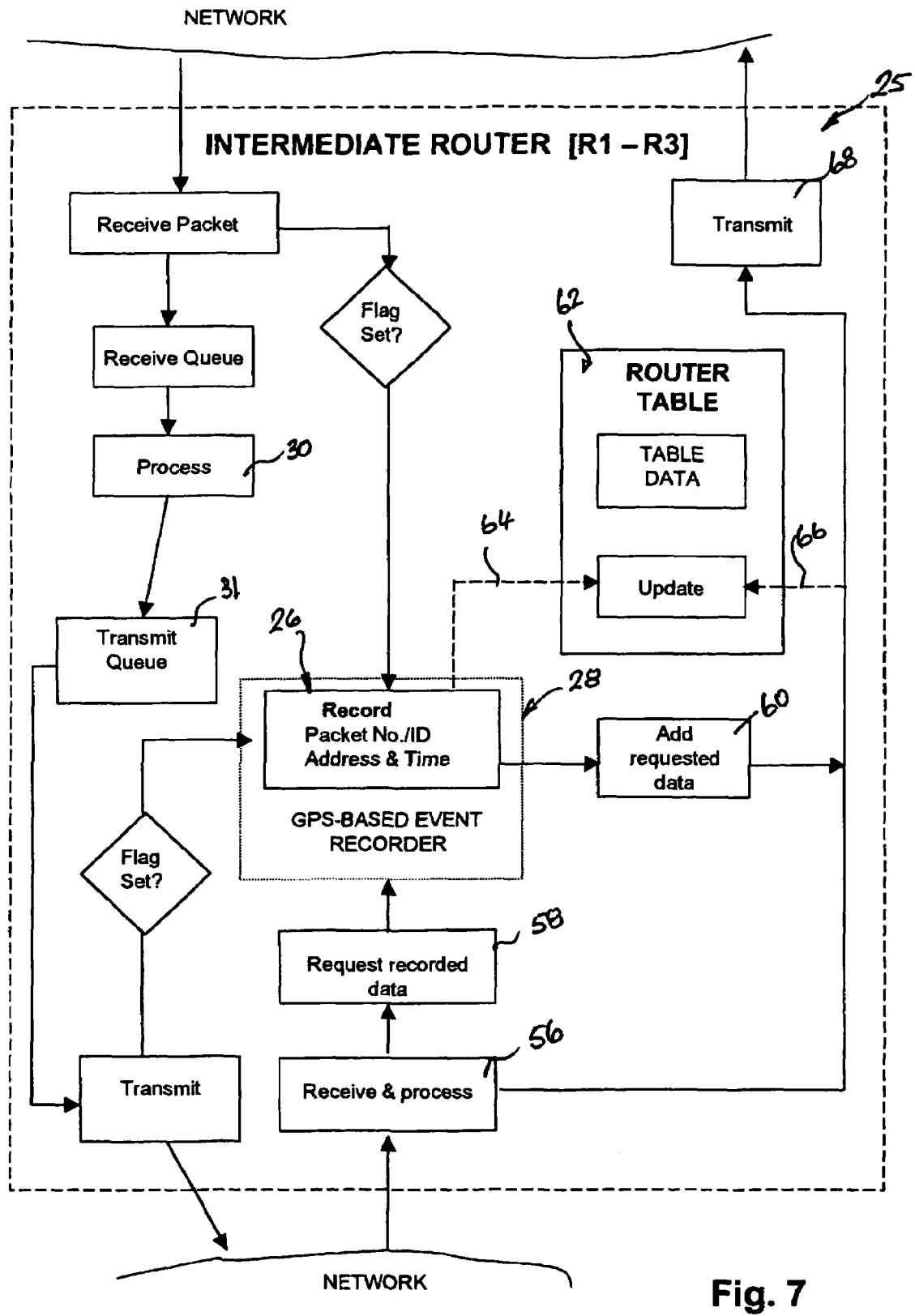
FIG. 7 is a schematic diagram of an intermediate switch or router of the second example that transmits and receives timer and/or reporting packets.
Figure 8:
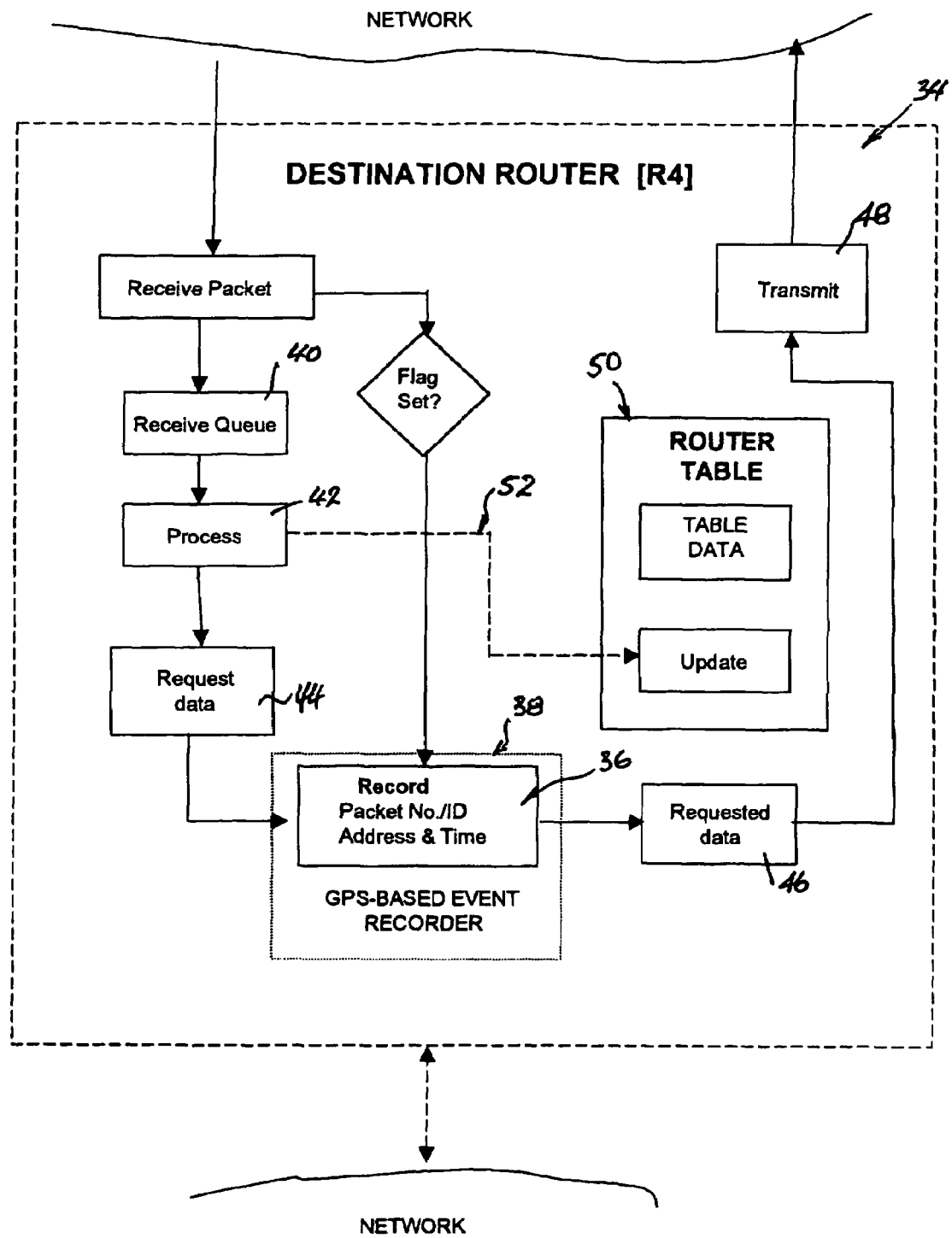
FIG. 8 is a schematic diagram of a destination or receiver switch of the second example that receives timer packets and generates reporting packets on demand.

The second example, shown in FIGS. 6-8, illustrates an alternative means of updating routing or latency tables in the routers of a network using a flag incorporated in the header of a packet, marking that packet as a timing packet. In this example, the flag is preferably incorporated in the network header that is normally stripped off the packet immediately upon receipt by a router, before it is queued for processing. However, the flag may be incorporated in a higher-level header, such as the IP or UDP header, or a flag may be incorporated in more than one of the packet's headers. For convenience, it will be assumed in this example that the flag is incorporated in a header that also includes some means of identifying the packet, such as a sequence number. This identification will be referred to as the packet ID.

In the example of FIGS. 6-8 one router 10 of a network 12 of other routers R1, R2 . . . initiates a process for updating information in its router table 14 by generating a short timing packet 16 that need comprise little more than a header incorporating a destination address, a timing flag and a unique packet ID. It will be assumed that packet 16 is addressed to destination router R4 and is to be routed via routers R1, R2 and R3 using ATM protocol. Router 10 incorporates a GPS-based event recorder 18 of the type disclosed in our prior patent. Timing packet 16 is created in a process diagrammatically indicated at 20 and queued for transmission in queue 22. When packet 16 is being transmitted its timer flag is detected and the packet ID is immediately input to event recorder 18, which records the UTS time with the ID as a packet transmission event in its event table 24.

Upon receipt of packet 16 at router R1 [indicated at 25 in FIG. 7], the packet header is immediately read and the packet recognised as a timer packet, whereupon the packet ID and UTS time are immediately recorded in the event table 26 of R1's event recorder 28 as a packet receipt event. Since (by pre-arrangement under the ATM protocol) packet 16 is to be forwarded to R2, it is processed at 30 and added to the packet-transmit queue 31 of R1. When packet 16 is being transmitted to R2, its header is again read and, upon detection of the timer flag, the packet ID and the UTS time are recorded in event table 26 of recorder 28 as a transmission event. The process of recording receipt and transmission events associated with packet 16 is then repeated in successive routers R2 and R3.

Finally, immediately upon receipt of timer packet 16 at destination router R4 [indicated at 34 in FIG. 8], the header of the packet is read and recognised as a timer packet and the time of receipt and the packet ID are recorded in the event table 36 of the event recorder 38 associated with router R4. The packet is placed in the receiving queue 40 for processing in unit 42. In the event that no other data or instructions are contained in the timer packet, it is destroyed as it is not to be forwarded to any other router, router R4/34 being the destination stipulated by router 10 at the time the route for timer packet 16 was set up.

It will be appreciated, as previously indicated, that any router may send a timer packet to any other router to which it is connected by a single hop. Whether and how frequently this can be done will be a matter for regulation by the network manager.

When network manager or router 10 wishes to collect latency data to up-date its router table 14, it can send a normal and separate network management query packet to each of routers R1, R2, R3 and R4 requesting their respective receipt and transmission times for packets with IDs specified by manager 10.

Alternatively, a single query packet may be routed through each router in turn along the route taken by the initial timer packet 16. Similarly, the manager may require the return of a separate data packet containing the desired time information from each router, or it may require each router to add its own time information to a common packet as it is being returned from the destination router R4. In any event, the time data returned by a router will include that router's ID as well as the receipt and transmission times for each packet ID specified by network manager 10.

For the sake of illustration, it will be assumed that router 10 generates a query packet 16*a* that does not have its timer flag set and is addressed to destination router R4/34 containing a message requesting router R4/34 to return its time data for the packet with the ID of packet 16. The receipt of packet 16*a* is not recorded in the event timers 18, 28 and 38 of routers 10, 25 and 34 (respectively) because its timer flag is not set. Upon receipt at destination router 34, packet 16*a* is treated as a normal management packet by process 42, which generates a data request 44 addressed to event timer 38 for the time of receipt of a packet with the ID of packet 16. This data (indicated at 46) is incorporated in a packet that is put on the network at the transmit unit 48 and (for the sake of example) is addressed to router 10 via intermediate routers R3, R2 and R1. If packet 16*a* also contains data for use by router R4 in updating its router table 50, the updating information is incorporated in table 50 as indicated by path 52 (shown in broken lines).

The returning packet from 34/R4 is received and processed by R3 as indicated at 56 and a request for timing data associated with packet 16 is generated at 58 and passed to event recorder 28, which outputs data at 60. In this example, data at 60 is added to that obtained from R4 and put on the network addressed to router 10 via intermediate routers R2 and R1. Since R3 is able to compare the time it recorded for the transmission of packet 16 with the time that R4 reported for the receipt of packet 16, it is able to compute the latency of the relevant link and to up-date its router table 62, as indicated by path 64 shown in broken lines. Additionally or alternatively, table 62 can be up-dated from the information in returning packet placed there by network manager 10 as shown by path 66 shown in broken lines. Finally, the returning packet is transmitted to manager 10 via transmitting unit 68.

At the network manger 10, the returning packet is received and processed at 70, the down-stream timing data is extracted at 72, a request is generated at 74 for the transmission data from event recorder 18 pertaining to timer packet 16 and the latencies for each link and each intermediate downstream router (R1, R2 and R3) are computed at 76. Using this latency data, the master router table 14 is updated.

Assuming, as will normally be the case, that the downstream routers have not directly updated their router tables in a piecemeal fashion, router 10 can (at an appropriate time) generate a multicast or broadcast packet (indicated at 80 in FIG. 6), which is then distributed so as to effect the updating of all relevant routing tables at much the same time.

Thus, to recapitulate, the router tables of routers other than the network manager 10 in network 12 can be updated in various ways. First, the network manager can have the sole responsibility for initiating timer packets, collecting timing data, computing latency information for the network and up dating the router table of each router in the network. This will have the advantage of low network overhead and high uniformity of router tables, but may place a burden on the manager such that the intervals between updating of all network routing tables is excessive. Alternatively, each intermediate router involved in a multi-hop transmission of a timer packet and involved in the same multi-hop response to a request for latency data can partially up-date its router table by extracting latency information from the query packet being returned. This partial up-date could be enhanced if the manager/initiator were to include its transmission time for each identified packet in its query. Alternatively again, each router can initiate its own timer packets, call for timing data from any other router(s) and update the latency information in its router table independently of the network manager or any other router.

It will be appreciated that this use of GPS-based event recorders of the type disclosed in our prior patent provides a particularly detailed and powerful method of maintaining router tables in a network. It permits the latency of any link and any router to be efficiently and accurately measured at any time, and it permits the frequent updating of any or all router tables in a network, with the minimum of management overheads. The need for inherently approximate, inaccurate and burdensome proxies (such as packet queue length) for router latency is eliminated. Instead, highly accurate (to the microsecond or better, if desired) link and/or router latencies can be determined with little burden upon routers or network managers.

While the benefits of the invention are evident from the above description of the chosen examples, it will be appreciated that many changes and modifications can be made without departing from the scope of the present invention as outlined above. For example, as already noted, it is not essential for there to be a separately identifiable flag in a timer packet where a distinctive header for timer packets is employed or where the header has a 'type' field that can be used to identify a timer packet. However, it is desirable to permit a timer packet to be identified with the minimum of disassembly or processing by a router to ensure that the minium of router processing latency is added to the upstream link latency.

The invention claimed is:

1. A method of determining the latency of a route between two switches in a packet-switched telecommunications network, comprising:
  transmitting an identified packet from a first switch to a second switch in the network via a predetermined route, wherein the identified packet comprises a timing flag to indicate that the identified packet is a timing packet,
  recording the universal time of transmittal of said packet at the first switch by the use of a first clock at the first switch that receives timing signals from a system of earth satellites,
  recording the universal time of receipt of said packet at the second switch by the use of a second clock at the second switch that receives timing signals from said system of earth satellites, and
  employing said times of transmission and receipt of said identified packet to determine the latency of said route.

2. A method according to claim 1 further comprising:
  encoding the universal time derived from the first clock into one of said identified packets transmitted by the first switch to the second switch via a predetermined one of multiple routes, said encoded time being the time of transmittal of said one packet,
  reading the encoded time in said one packet when it is received at the second switch, and
  using the read encoded time, together with the time of reception of said one packet at the second switch, to determine the latency of said predetermined route from the first switch to the second switch.

3. A method according to claim 1 further comprising:
  setting the timing flag in one of said identified packets transmitted by the first switch substantially simultaneously with the transmission of said one packet to the second switch via a predetermined route, recording at the first switch the universal time, having regard to the first clock, at which said timing flag is set, examining packets received at the second switch to determine if each is one of said identified packets and, if so, whether said timing flag has been set, resetting the timing flag in said one identified packet at the second switch substantially simultaneously with the reception of that packet at the second switch, recording at the second switch the universal time, having regard to the second switch, at which said timing flag is reset, and comparing the universal time at which said timing flag was set in the first switch with the universal time at which that timing flag was reset at the second switch to determine the latency of said predetermined route.

4. A method according to claim 3 further comprising:

transmitting a data-request packet from the first switch to the second switch requesting the universal time at which the timing flag in said one identified packet was reset, receiving at the first switch said data-request packet from the second switch, reading at said first switch the universal time at which the timing flag in said one identified packet was reset, computing at the first switch the latency of said predetermined route by comparing said time read from the data-request packet with the universal time recorded at the first switch, and updating a routing table stored in a memory at the first switch with said computed latency.

5. A method according to claim 3 further comprising:

transmitting a data-request packet from a network controller to the first switch requesting the universal time at which the timing flag in said one identified packet was set transmitting a data-request packet from said network controller to the second switch requesting the universal time at which the timing flag in said one identified packet was reset, receiving at the network controller said data-request packets returned from the first and second switches, computing at the network controller the latency of said predetermined route by comparing the flag-set and flag-reset times read from said data-request packets in respect of said one identified packet, and updating a routing table stored in a memory at the network controller with said computed latency.

6. A method according to claim 3 wherein said predetermined route between the first and second switches is via an intermediate third switch, the method further comprising:

identifying at the third switch the source, namely the first switch, and the destination, namely the second switch, of said one identified packet as it is passed through the third switch en route to the second switch, generating and transmitting a first a data-request packet from the third switch to the first switch requesting the universal time at which the timing flag in said one identified packet was set, generating and transmitting a second data-request packet from said third switch to the second switch requesting the universal time at which the timing flag in said one identified packet was reset, receiving at the third switch said data-request packets returned from the first and second switches, computing at the third switch the latency of said predetermined route by comparing the flag-set and flag-reset times read from said data-request packets in respect of said one identified packet, updating a routing table stored in a memory at the third switch with said computed latency, and transmitting portions of the routing table at the third switch relevant to the first and second switches to said first and second switches respectively.

7. A method according to claim 6 wherein the third switch comprises a network controller.

8. A method according to claim 1 wherein the timing flag comprises a single bit within a packet header of the identified packet.

9. A method according to claim 8 wherein the packet header of the identified packet comprises a network header of the identified packet.

10. A method according to claim 1 wherein the identified packet comprises multiple headers, wherein more than one of the multiple headers of the identified packet incorporates the timing flag.

11. A packet switch for use in a packet-switching network, the switch having:

connection means to connect the switch to a plurality of telecommunications links, transmitter means for placing identifiable outgoing timing packets on to one or more of said links, wherein the timing packets comprise timing flags, receiver means for taking identifiable incoming packets off one or more of said links, clock means to derive universal time from the signals of a system of earth satellites, recording means for recording the identity of each of said outgoing and each of said incoming packets together with the universal time of transmission and reception, respectively, of each packet, memory means to store in a routing table data signifying the latency of network routes accessible from each of said links, and updating means to compute the latency of said routes by reference to the times of transmission and reception, as derived by said clock means, of said identifiable packets, and said updating means to store such latency data in the memory means in a manner that effects the updating of said router table.

12. A packet switch according to claim 11 to process incoming packets generated by remote switches, which incoming packets include time-data indicative of the universal time at the respective remote switch where said incoming packet was generated, the packet switch including:

encoding means associated with said transmitter means to encode the universal time at the packet switch corresponding to the time of transmission of each of said outgoing packets and to insert encoded time-data into each packet that is representative of the time of transmission of that packet, decoding means associated with said receiver means to decode the time-data in each of said incoming packets and to feed the decoded time-data for each respective incoming packet to said updating means.

13. A packet switch according to claim 12 to process incoming packets generated by remote switches, each of which incoming packets includes a timing flag, wherein:

said transmitter means to set a timing flag in each of said outgoing packets at the time of transmission of said packet, said receiver means to detect the timing flag in each incoming packet and to reset that timing flag, said recording means to record the time at which said timing flag is set in an outgoing packet as proxy for the time of transmission of that packet, and wherein said receiver means to record the time that the timing flag of an incoming packet is reset as proxy for the time of reception of the respective incoming packet.

14. A packet switch according to claim 11 to process incoming packets generated by remote switches, each of which incoming packets includes a timing flag, wherein:

said transmitter means to set the timing flag in each of said outgoing packets at the time of transmission of said packet, said receiver means to detect the timing flag in each incoming packet and to reset that timing flag, said recording means to record the time at which said timing flag is set in an outgoing packet as proxy for the time of transmission of that packet, and wherein said receiver means to record the time that the timing flag of an incoming packet is reset as proxy for the time of reception of the respective incoming packet.

15. A packet switch according to claim 11 wherein each of the timing flags comprises a single bit within a packet header of the corresponding timing packets.

16. A packet switch according to claim 15 wherein multiple packet headers of at least one of the timing packets comprise the timing flag of the corresponding timing packet.

17. A packet switch according to claim 15 wherein the packet header comprising the single bit also comprises a packet identifier of the corresponding timing packet.

18. A packet switch according to claim 11 wherein the timing flag comprises a value other than a value of time.

19. In a packet-switched telecommunications network:

a first switch to transmit and receive packets via multiple routes in the network to and from a second switch, memory means to store a routing table comprising data indicative of the latency of each one of said multiple routes between said first and said second switches, logic means to consult said routing table and select one of said multiple routes for a packet to be transmitted from the first switch, having regard to the latency of said route stored in the routing table, a first clock at the first switch to derive universal time from the signals of a system of earth satellites and a second clock at the second switch to derive universal time from said system, first recording means at the first switch to record the time of transmission and reception of identified packets by said first switch having regard to the universal time derived by said first clock, wherein the identified packets comprise timing flags to indicate that the identified packets are timing packets, second recording means at the second switch to record the time of transmission and reception of identified packets by said second switch having regard to the universal time derived by said second clock, and updating means to determine latency of each one of said multiple routes, having regard to the recorded times of transmission and reception of said identified packets, and to update said routing table with said determined latency determinations.

20. A packet-switched telecommunications network comprising:

a plurality of packet switches connected to one another by a plurality of telecommunications links to form multiple routes for packets travelling from source to destination in the network, memory means in each switch to store a routing table comprising data indicative of the latency of each one of a plurality of possible packet routes from that switch to a destination, logic means in each switch to consult the respective routing table and to select a route for a packet to be transmitted from that switch having regard to the latency of said route stored in the respective routing table, a clock associated with each switch to derive the universal time at the associated switch from the signals of a system of earth satellites, recording means at each switch to record the time of transmission and reception of identified packets at that switch having regard to the universal time at that switch as determined by the clock associated with that switch, wherein the identified packets comprise timing flags to indicate that the identified packets are timing packets, and updating means to update the routing table of a switch by reference to the recorded times of transmission and reception of said identified packets within the network.

* * * * *